US011782493B2

(12) United States Patent
Sahu et al.

(10) Patent No.: US 11,782,493 B2
(45) Date of Patent: Oct. 10, 2023

(54) METHOD AND SYSTEM FOR INTELLIGENT POWER DISTRIBUTION MANAGEMENT

(71) Applicant: EMC IP Holding Company LLC, Hopkinton, MA (US)

(72) Inventors: Santosh Kumar Sahu, Bangalore (IN); Sathish Kumar Ponnusamy, Bangalore (IN); Suren Kumar J, Tamil Nadu (IN); Vinod Durairaj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 259 days.

(21) Appl. No.: 16/943,757

(22) Filed: Jul. 30, 2020

(65) Prior Publication Data
US 2022/0035429 A1 Feb. 3, 2022

(51) Int. Cl.
*G06F 1/28* (2006.01)
*G06F 1/32* (2019.01)
*G06F 11/30* (2006.01)
*G06F 1/3215* (2019.01)
*G06F 1/3234* (2019.01)
*G06F 1/3209* (2019.01)

(52) U.S. Cl.
CPC ............ *G06F 1/28* (2013.01); *G06F 1/325* (2013.01); *G06F 1/3209* (2013.01); *G06F 1/3215* (2013.01); *G06F 11/3062* (2013.01)

(58) Field of Classification Search
CPC ....................................................... G06F 1/28
See application file for complete search history.

(56) References Cited

U.S. PATENT DOCUMENTS

| | | | | |
|---|---|---|---|---|
| 10,379,558 | B2* | 8/2019 | Liang | G06F 1/3206 |
| 2003/0037150 | A1* | 2/2003 | Nakagawa | G06F 1/28 |
| | | | | 713/300 |
| 2007/0050644 | A1* | 3/2007 | Merkin | G06F 1/206 |
| | | | | 713/300 |
| 2010/0211804 | A1* | 8/2010 | Brumley | G06F 1/3203 |
| | | | | 713/300 |
| 2011/0007491 | A1* | 1/2011 | Robinson | H02M 3/04 |
| | | | | 361/810 |
| 2012/0078430 | A1* | 3/2012 | Fan | G06F 1/329 |
| | | | | 700/295 |
| 2015/0094871 | A1* | 4/2015 | Bhageria | H02J 13/00017 |
| | | | | 700/297 |
| 2016/0011914 | A1* | 1/2016 | Bohn | G06F 9/5094 |
| | | | | 713/300 |
| 2020/0183467 | A1* | 6/2020 | Anantharangachar | |
| | | | | G06F 9/5094 |
| 2021/0397239 | A1* | 12/2021 | Sethi | G06F 1/30 |

\* cited by examiner

*Primary Examiner* — Jaweed A Abbaszadeh
*Assistant Examiner* — Cheri L Harrington
(74) *Attorney, Agent, or Firm* — Chamberlain, Hrdlicka, White, Williams & Aughtry

(57) ABSTRACT

A method and system for intelligent power distribution management. Specifically, the disclosed method and system propose allocating (and deallocating) reserve or supplemental electrical power to host devices dynamically based on intelligent analyses of host device telemetry including, but not limited to, workload criticality, workload computing resource utilization, hardware configuration metadata, various operational parameters describing host device state, and measurements (as well as other information) pertinent to electrical power usage.

14 Claims, 5 Drawing Sheets

METHOD AND SYSTEM FOR INTELLIGENT POWER DISTRIBUTION MANAGEMENT

BACKGROUND

Electrical power drives computing resource efficiency and functionality and, therefore, directly impacts host device performance. Often times, however, host device performance may be hampered due to the lack of reserve power resources.

SUMMARY

In general, in one aspect, the invention relates to a method for intelligent power distribution management. The method includes identifying a set of power-hungry devices, generating, in order of workload criticality for workloads supported thereon, a host priority list ranking the set of power-hungry devices, and allocating, based on the host priority list, reserve electrical power to a set of top-ranked power-hungry devices.

In general, in one aspect, the invention relates to a non-transitory computer readable medium (CRM). The non-transitory CRM includes computer readable program code, which when executed by a computer processor, enables the computer processor to identify a set of power-hungry devices, generate, in order of workload criticality for workloads supported thereon, a host priority list ranking the set of power-hungry devices, and allocate, based on the host priority list, reserve electrical power to a set of top-ranked power-hungry devices.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for intelligent power distribution management. Specifically, one or more embodiments of the invention propose allocating (and deallocating) reserve or supplemental electrical power to host devices dynamically based on intelligent analyses of host device telemetry including, but not limited to, workload criticality, workload computing resource utilization, hardware configuration metadata, various operational parameters describing host device state, and measurements (as well as other information) pertinent to electrical power usage.

Figure 1:
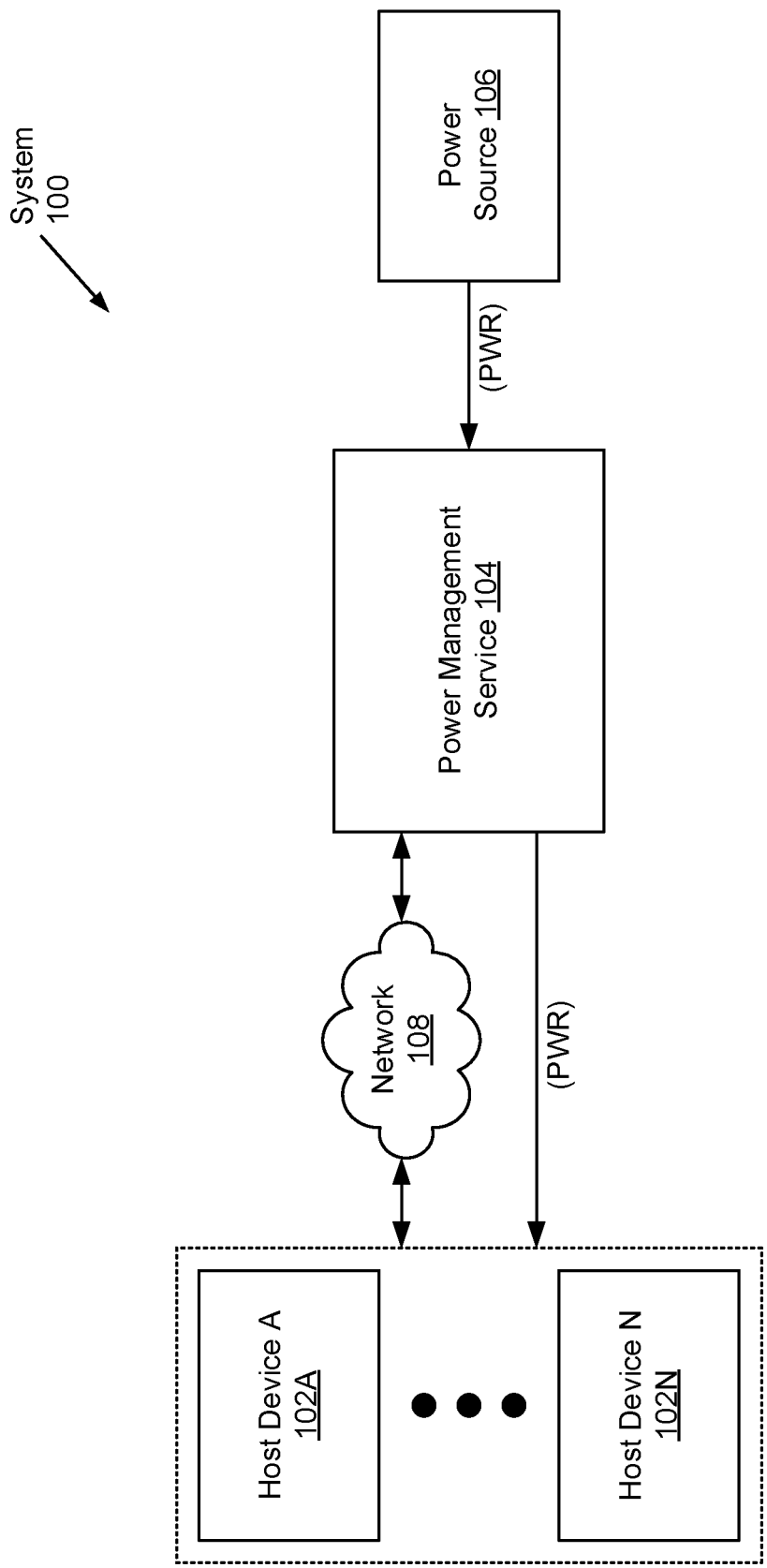
FIG. 1 shows a system in accordance with one or more embodiments of the invention.

FIG. 1 shows a system in accordance with one or more embodiments of the invention. The system (100) may reference a datacenter or a cloud computing environment, where a configuration of various information technology (IT) components (e.g., servers, storage, networking, management, etc.) may reside and operate. Further, the system (100) may include, but is not limited to, multiple host devices (102A-102N) operatively connected to a power management service (104), which, in turn, may operatively connect to a power source (106). Each of these system (100) components is described below.

In one embodiment of the invention, a host device (102A-102N) may represent any physical appliance or computing system configured to receive, generate, process, store, and/or transmit data, as well as to provide an environment in which one or more computer programs (or workloads) may execute thereon. The computer program(s) may, for example, implement large-scale and complex data processing; or implement one or more services offered locally or over a network. In providing an execution environment for the computer program(s) or workload(s) running thereon, a host device (102A-102N) may include and allocate various resources (e.g., computer processors, memory, storage, virtualization, networking, etc.), as needed, for the computer program(s) or workload(s) to consume. One of ordinary skill will appreciate that a host device (102A-102N) may perform other functionalities without departing from the scope of the invention. By way of examples, a host device (102A-102N) may be implemented as a server or any other computing system similar to the exemplary computing system shown in FIG. 5. Host devices (102A-102N) are described in further detail in FIG. 2, below.

In one embodiment of the invention, the power management service (104) may represent IT infrastructure configured for intelligent power distribution management. To that extent, the power management service (104) may include functionality to pool and allocate or distribute primary, as well as reserve, electrical power, as needed, to the host device(s) (102A-102N). Power allocation may be driven by machine learning and/or artificial intelligence based analytics. Further, the power management service (104) may be implemented using one or more servers (not shown). Each server may represent a physical or virtual server, which may reside in a datacenter or a cloud computing environment. Additionally or alternatively, the power management service (104) may be implemented using one or more computing systems similar to the exemplary computing system shown in FIG. 5. The power management service (104) is described in further detail in FIG. 3, below.

In one embodiment of the invention, the power source (106) may represent any facility (e.g., electrical grid, power plant, etc.), machine (e.g., fuel generator), or a combination thereof, from which electricity or electrical power may be obtained. The obtained electrical power may include alternating current (AC) electricity, direct current (DC) electricity, or a combination thereof. Further, electrical power supplied from the power source (106) to the power management service (104), or from the latter to each host device (102A-102N), may be facilitated through any directly connected, cabled solution configured for electrical power transfer. More specifically, the cabled solution (or electrical cable) may refer to any assembly of one or more conductive wires (also referred to as electrical conductors) used for the transmission of electricity over short and/or long distances.

In one embodiment of the invention, the host devices (102A-102N) and the power management service (104) may communicate with one another (i.e., exchange data) through a network (108) (e.g., a local area network (LAN), a wide area network (WAN) such as the Internet, a mobile network, any other network type, or a combination thereof). The network (108) may be implemented using any combination of wired and/or wireless connections. Further, the network (108) may encompass various interconnected, network-enabled subcomponents (or systems) (e.g., switches, routers, gateways, etc.) that may facilitate communications between the host devices (102A-102N) and the power management service (104). Moreover, in communicating with one another, the host devices (102A-102N) and the power management service (104) may employ any combination of wired and/or wireless communication protocols.

While FIG. 1 shows a configuration of components, other system (100) configurations may be used without departing from the scope of the invention.

Figure 2:
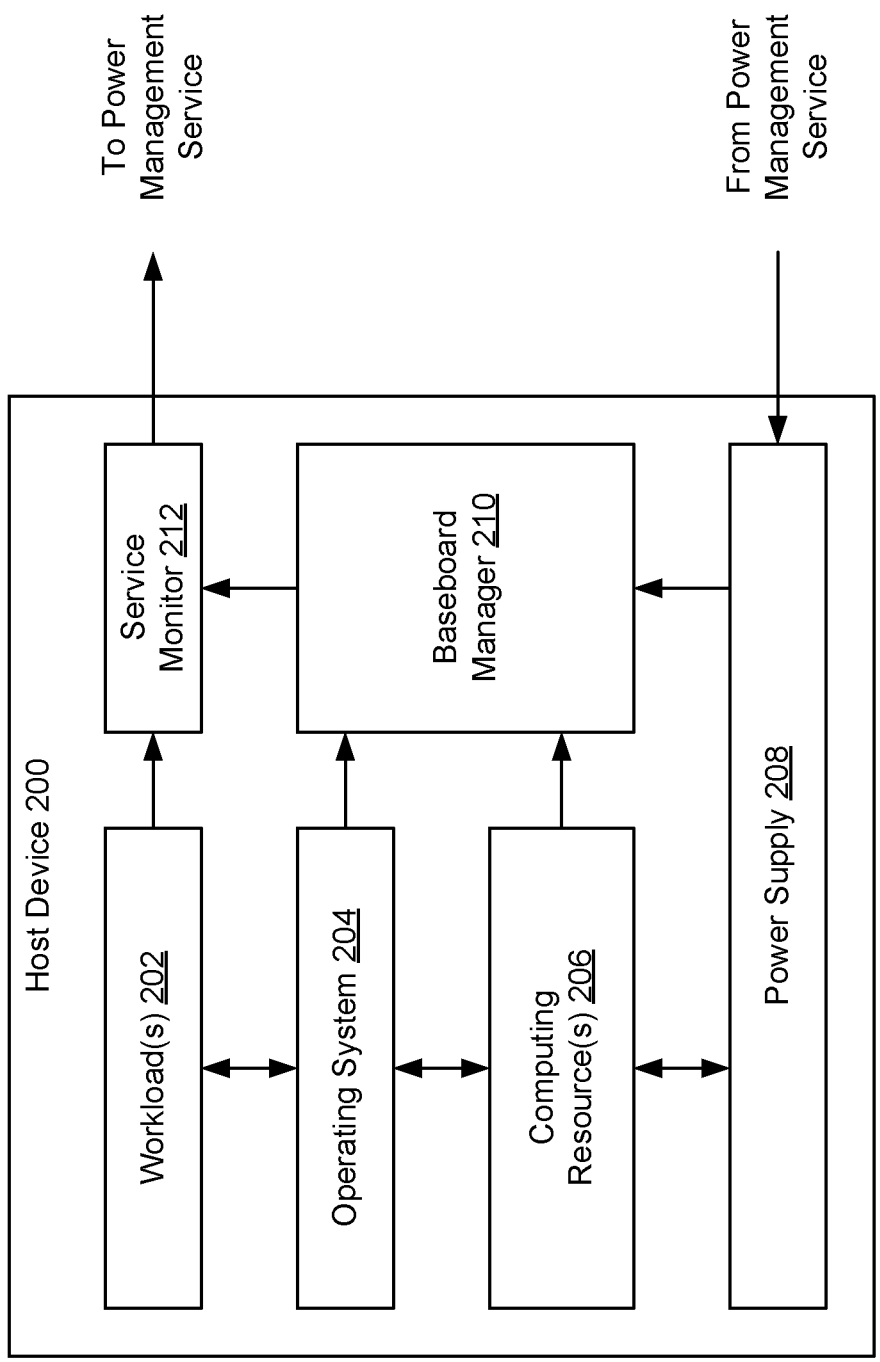
FIG. 2 shows a host device in accordance with one or more embodiments of the invention.

FIG. 2 shows a host device in accordance with one or more embodiments of the invention. The host device (200) may include one or more workloads (202), an operating system (204), various computing resources (206), a power supply (208), a baseboard manager (210), and a service monitor (212). Each of these host device (200) subcomponents is described below.

In one embodiment of the invention, a workload (202) may refer to a host device (200) resource configured to perform certain work functions. A workload (202) may be instantiated, and may operate while consuming at least a portion of the computing resources (206) available, on the host device (200). Further, to request and access the computing resources (206), a workload (202) may include functionality to submit service calls to the operating system (204). Examples of a workload (202) may include, but are not limited to, a virtual machine, a container, a database, an application, and a collection of micro-services.

In one embodiment of the invention, the operating system (204) may refer to a computer program that executes on the underlying hardware of the host device (200), which may be responsible for overseeing host device (200) operations. To that extent, the operating system (204) may include functionality to, for example, support fundamental host device (200) functions; schedule tasks; mediate interactivity between logical (e.g., software) and physical (e.g., hardware) host device (200) subcomponents; allocate the computing resources (206) as needed and as requested via service calls from the workload(s) (202); and execute or invoke other computer programs executing on the host device (200). One of ordinary skill will appreciate that the operating system (204) may perform other functionalities without departing from the scope of the invention.

In one embodiment of the invention, a computing resource (206) may refer to a hardware device, a software construct, or a combination thereof, which may facilitate workload (202) functionality. A computing resource (206) may be of limited availability on the host device (200) and, accordingly, may be requested, allocated, and consumed by way of measurable quantities or units (e.g., processing cores, memory or storage space bytes, virtual threads, bandwidth bytes per second, etc.). Furthermore, examples of a computing resource (206) may include, but are not limited to, a central processing unit (CPU), a graphics processing unit (GPU), any other integrated circuit configured to execute computer readable program code or instructions, volatile memory (e.g., random access memory (RAM), cache memory, etc.), persistent or non-volatile storage (e.g., hard disk drive (HDD), solid state drive (SSD), etc.), and a network card or adapter.

In one embodiment of the invention, the power supply (208) may refer to a physical device designed and configured to provide operational electrical power to one or more host device hardware components (e.g., computing resources (206)). To that extent, the power supply (208) may include functionality to convert or step-down alternating current (AC) or direct current (DC) high-voltage routed from the power management service (not shown) to one or more DC low-voltages required and regulated for stable operation of the host device (200). Furthermore, the power supply (208) may include circuitry (e.g., rectifiers, transformers, voltage dividers, voltage regulators, etc.) necessary to perform any electrical power conversions.

In one embodiment of the invention, the baseboard manager (210) may refer to a physical controller on a main system board (or motherboard) of the host device (200), a computer program executing on the underlying hardware of the host device (200), or a combination thereof, which may be responsible for monitoring host device (200) state. To that extent, the baseboard manager (210) may employ or access various physical and/or logical sensors throughout the host device (200), which may be configured to measure various variables. These variables may include, but are not limited to, temperature, humidity, electrical power voltage, fan speed, communication bus errors, basic input-output system (BIOS) status, operating system (204) functions, and other operational parameters pertinent to the host device (200). Further, the baseboard manager (210) may collect and log these various variables periodically or on-demand and, subsequently, provide the collected/logged information to the service monitor (212). One of ordinary skill will appreciate that the baseboard manager (210) may perform other functionalities without departing from the scope of the invention.

In one embodiment of the invention, the service monitor (212) may refer to a computer program that executes on the underlying hardware of the host device (200), which may be responsible for aggregating monitoring telemetry. Monitoring telemetry may encompass a collection of measurements (and other information) descriptive or representative of the state of the host device (200), as well as the workload(s) (202) running thereon, at a given point-in-time. To that extent, the service monitor (212) may include functionality to: obtain various operational parameters (described above) from, and monitored by, the baseboard manager (210); monitor workload (202) functionality to obtain or infer workload (202) criticality and computing resource (206) utilization information; and transmit, via the network (not shown), at least the various obtained operational parameters, as well as the workload (202) criticality and computing resource (206) utilization information, to the power management service (not shown). One of ordinary skill will appreciate that the service monitor (212) may aggregate and transmit additional information (e.g., hardware configuration metadata—e.g., number and clock speeds of processing cores, memory and/or storage capacities, etc.), and may perform other functionalities, without departing from the scope of the invention.

While FIG. 2 shows a configuration of subcomponents, other host device (200) configurations may be used without departing from the scope of the invention.

Figure 3:
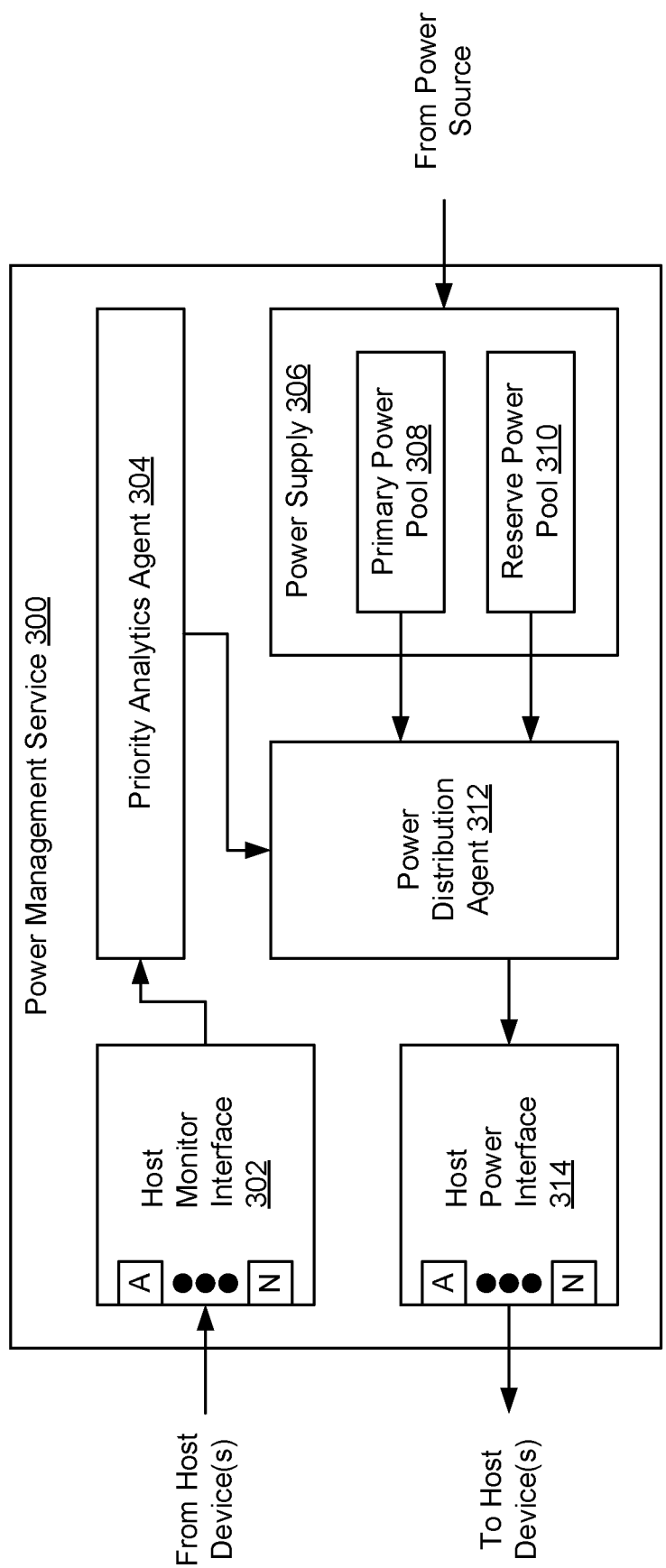
FIG. 3 shows a power management service in accordance with one or more embodiments of the invention.

FIG. 3 shows a power management service in accordance with one or more embodiments of the invention. The power management service (300) may include a host monitor interface (302), a priority analytics agent (304), a power supply (306), a power distribution agent (312), and a host power interface (314). Each of these power management service (300) subcomponents is described below.

In one embodiment of the invention, the host monitor interface (302) may refer to networking hardware (e.g., network card or adapter), a logical interface, an interactivity protocol, or any combination thereof, which may be responsible for facilitating communications between the power management service (300) and one or more host devices (not shown). Specifically, the host monitor interface (302) may include functionality to receive monitoring telemetry (described above) (see e.g., FIG. 2) from each of the host device(s) and, subsequently, provide the received monitoring telemetry to the priority analytics agent (304) for processing. Further, one of ordinary skill will appreciate that the host monitor interface (302) may perform other functionalities without departing from the scope of the invention.

In one embodiment of the invention, the priority analytics agent (304) may refer to a computer program that executes on the underlying hardware of the power management service (300), which may be responsible for monitoring telemetry processing. To that extent, the priority analytics agent (304) may include functionality to: obtain monitoring telemetry from the host monitor interface (302), which may at least describe or represent the current state of various host devices (not shown), as well as the criticalities and resource utilizations of the workloads thereon; analyze the obtained monitoring telemetry to derive a host priority list (described below); and provide the derived host priority list to the power distribution agent (312) for interpretation and action. One of ordinary skill will appreciate that the priority analytics agent (304) may provide additional information (e.g., electrical power related measurements and utilization metrics) to the power distribution agent (312), as well as perform other functionalities, without departing from the scope of the invention.

In one embodiment of the invention, the priority analytics agent (304) may employ or invoke machine learning and/or artificial intelligence, at least in part, to derive host priority lists from obtained monitoring telemetry. More specifically, the priority analytics agent (304) may configure, and process the monitoring telemetry using, ensemble classification, regression, and/or recommendation learning models or algorithms (e.g., neural networks, decision trees or forests, etc.). Through an ensemble methodology (e.g., bootstrap aggregating (BAGG-ing), boosting, Bayesian model averaging, stacking, etc.), an optimal learning model or algorithm may be derived from the combination of multiple base learning models or algorithms, where the optimal learning model/algorithm exhibits better overall performance than could be obtained from any of the constituent (base) learning models/algorithms alone.

In one embodiment of the invention, a host priority list may represent a data object (e.g., file) or a data structure (e.g., table) that specifies one or more host devices (or more specifically, unique identifiers thereof) in a ranked order. The ranking of the host device(s), specified in a host priority list and based, at least in part, on workload criticality, may reflect their respective priorities for receiving supplemental electrical power from a reserve power pool (310) (described below). Electrical power drives computing resource efficiency and functionality and, therefore, directly impacts host device performance. Accordingly, higher ranked host devices may support more critical workloads, which thereby require precedence (over other less critical workloads running on other lesser ranked host devices) for supplemental electrical power.

In one embodiment of the invention, each host device specified in a host priority list may be identified as a power-hungry device. A power-hungry device may represent a host device that consumes electrical power nearing an electrical power maximum or limit imposed thereon. Because electrical power limits may be imposed on any power-hungry device, a power-hungry device may also be identified as a power-cap device. A power-cap device may represent a host device whereon a power-cap feature is enabled, where the power-cap feature may refer to a management functionality that limits electrical power usage by the host device to a configurable threshold (e.g., 400 watts). In addition, to be eligible to receive supplemental electrical power, a power-hungry device may further be identified as a power-cache device. A power-cache device may represent a host device whereon a power-cache feature is enabled, where the power-cache feature may refer to a management functionality that permits allocation of available reserve electrical power, from a reserve power pool (310), to the host device and, thereby, allows the host device to temporarily supersede their imposed electrical power usage limit.

In one embodiment of the invention, the power supply (306) may refer to a physical device designed and configured to provide operational electrical power to one or more power management service (300) hardware components (e.g., computer processors, memory, storage, interfaces, etc.). The power supply (306) may further be configured to provide operational electrical power, through intelligent allocation and distribution, to one or more host devices (and hardware components thereon). To that extent, the power supply (306) may include functionality to: convert or step-down AC high-voltage from a power source (not shown) to one or more DC low-voltages required and regulated for stable operation of the power management service (300); and maintain AC high-voltage (or convert from AC high-voltage to DC high-voltage) for distribution to the host device(s). Furthermore, the power supply (306) may include circuitry (e.g., rectifiers, transformers, voltage dividers, voltage regulators, etc.) necessary to perform any electrical power conversions.

In one embodiment of the invention, the power supply (306) may further include functionality to divide the incoming electrical power, from the power source, into a primary power pool (308) and a reserve power pool (310). That is, the power supply (306) may employ circuitry to isolate a percentage (e.g., 80%) of the incoming electrical power for primary power pool (308) use, while isolating a remaining percentage (e.g., 20%) of the incoming electrical power for reserve power pool (310) use. Further, the primary power pool (308) may be tapped to distribute main electrical power needs (or limits thereof) to one or more host devices, whereas the reserve power pool (310) may be tapped to distribute supplemental electrical power to sustain one or more power-hungry devices (described above).

In one embodiment of the invention, the power distribution agent (312) may refer to a computer program that executes on the underlying hardware of the power management service (300), which may be responsible for electrical power allocation to one or more host devices (not shown). To that extent, the power distribution agent (312) may include functionality to: manage the supply of electrical power from the primary power pool (308) to one or more host devices; impose electrical power limits (i.e., power-cap feature (described above)), configured by administrators, for the consumption of electrical power from the primary power pool (308) by one or more host devices; obtain host priority lists (and other electrical power pertinent information) from the priority analytics agent (304); and allocate (and de-allocate) electrical power from the reserve power pool (310) to (and from) one or more host devices at least based on the obtained host priority lists. Electrical power distribution, from the reserve power pool (310), may also be driven based on the amount (e.g., wattage) of electrical power available at any given point-in-time, as well as the amount (e.g., wattage) of electrical power demanded from host device(s) specified in the obtained host priority lists. One of ordinary skill will appreciate that the power distribution agent (312) may perform other functionalities without departing from the scope of the invention.

In one embodiment of the invention, the host power interface (314) may refer to a physical (or hardware) device fitted with multiple outputs configured to distribute electrical power to multiple host devices (not shown), respectively. To that extent, the host power interface (314) may include functionality to: obtain allocated electrical power (sourced from the power supply (306), however, managed or controlled by the power distribution agent (312) (described above)); and disseminate the allocated electrical power to the appropriate host device(s). By way of an example, the host power interface (314) may be implemented as a power distribution unit (PDU), which may be rack-, chassis-, or floor-mounted.

While FIG. 3 shows a configuration of subcomponents, other power management service (300) configurations may be used without departing from the scope of the invention.

Figure 4:
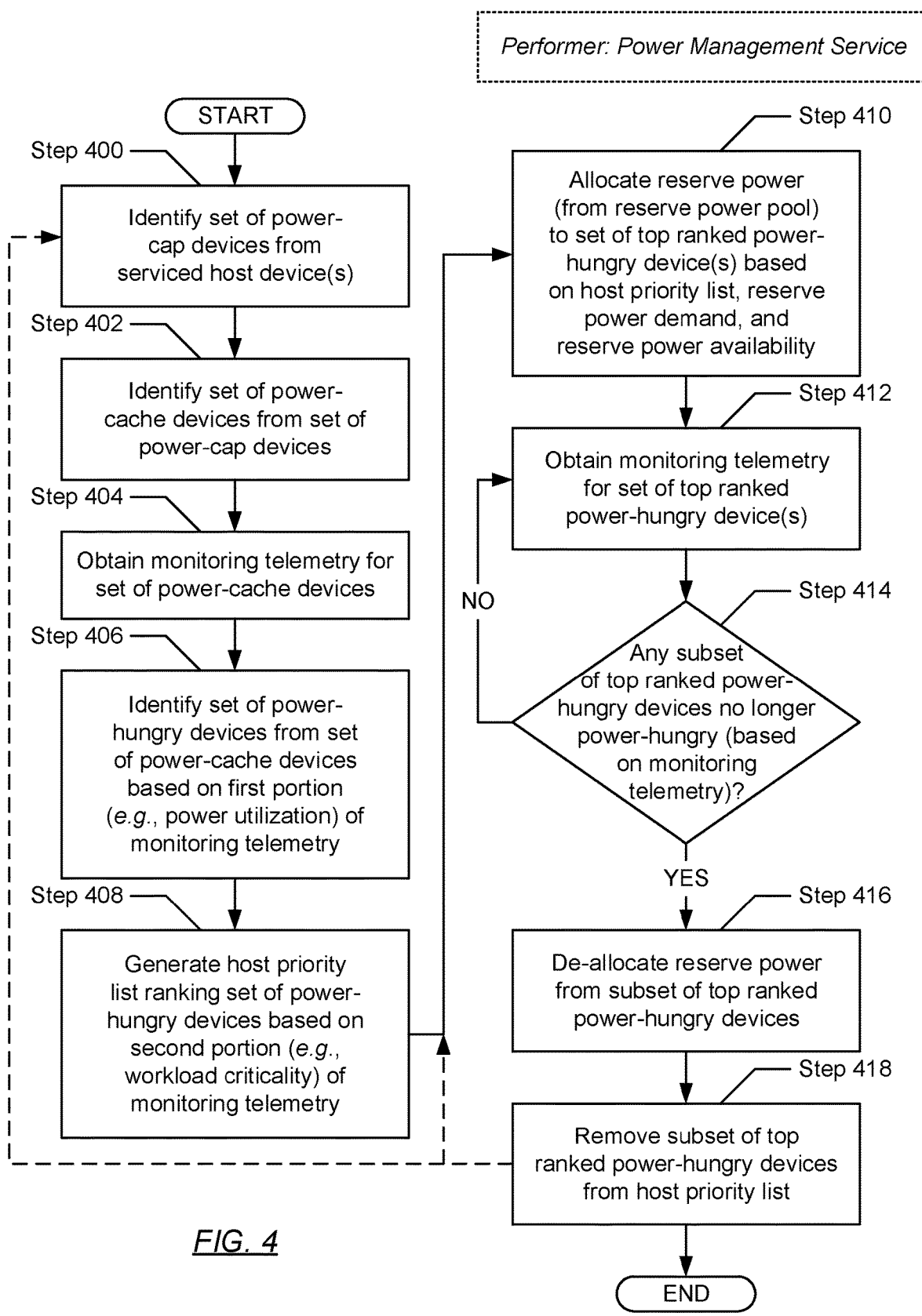
FIG. 4 shows a flowchart describing a method for intelligent power distribution management in accordance with one or more embodiments of the invention.

FIG. 4 shows a flowchart describing a method for intelligent power distribution management in accordance with one or more embodiments of the invention. The various steps outlined below may be performed by the power management service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a set of power-cap devices is identified. In one embodiment of the invention, each power-cap device may be selected from a superset of host devices, which may be serviced by the power management service. Further, a power-cap device may represent a host device whereon a power-cap feature is enabled, where the power-cap feature may refer to a management functionality that limits electrical power usage by the host device to a configurable threshold (e.g., 400 watts).

In Step 402, a set of power-cache devices is identified. In one embodiment of the invention, each power-cache device may be selected from the set of power-cap devices (identified in Step 400). Further, a power-cache device may represent a host device whereon a power-cache feature is enabled, where the power-cache feature may refer to a management functionality that permits allocation of available reserve electrical power, from a reserve power pool on the power management service (see e.g., FIG. 3), to the host device and, thereby, allows the host device (i.e., power-cap device) to temporarily supersede their imposed electrical power usage limit.

In Step 404, monitoring telemetry is obtained for each power-cache device of the set of power-cache devices (identified in Step 402). In one embodiment of the invention, monitoring telemetry may encompass a collection of measurements (and other information) descriptive or representative of the state of each power-cache device, as well as the workload(s) running thereon, at a current or most recent point-in-time.

In Step 406, a set of power-hungry devices is identified. In one embodiment of the invention, each power-hungry device may be selected from the set of power-cache devices (identified in Step 402), and based on at least a portion of the monitoring telemetry (e.g., measurements and other information pertinent to electrical power usage) (obtained in Step 404). Further, a power-hungry device may represent a host device that consumes electrical power nearing an electrical power maximum or limit (i.e., power-cap) imposed thereon.

In Step 408, a host priority list is generated. In one embodiment of the invention, the host priority list may represent a data object (e.g., file) or a data structure (e.g., table) that specifies the set of power-hungry devices (identified in Step 406) in a ranked order. Specifically, the ranking of the power-hungry devices may reflect their respective priorities for receiving supplemental electrical power from a reserve power pool (see e.g., FIG. 3). Based on this ranking, higher ranked power-hungry devices require precedence (over other lesser ranked power-hungry devices) for the allocation of supplemental electrical power. Furthermore, the host priority list may be generated, at least in part, through processing of another portion of the monitoring telemetry (e.g. workload criticality and resource utilization, hardware configuration metadata, and various operational parameters defining host device state) (obtained in Step 404) using ensemble machine learning and/or artificial intelligence. Moreover, in one embodiment of the invention, the generated host priority list may be overridden or edited, at any point-in-time, by datacenter administrators.

In Step 410, reserve electrical power is allocated to one or more top-ranked power-hungry devices specified in the host priority list (generated in Step 408). That is, in one embodiment of the invention, reserve electrical power may be distributed to the power-hungry host devices in accordance with their respective rankings, as specified in the host priority list. Furthermore, allocation of reserve electrical power to the top-ranked power-hungry device(s) may consume all electrical power sourced from the reserve power pool. Therefore, which top-ranked power-hungry device(s) is/are allocated reserve electrical power may depend on the respective supplemental power demands of the power-hungry device(s), as well as the available amount (e.g., wattage) of reserve electrical power, at present. Moreover, though one or more top-ranked power-hungry devices may receive reserve electrical power matching their respective supplemental power demands, one or more top-ranked power-hungry devices may receive reserve electrical power equivalent to a portion of their respective supplemental power demands, whereas the remaining (lesser-ranked) power-hungry device(s) may receive zero reserve electrical power, at least at present. Those power-hungry device(s), with power demands unmet by the current distribution of available reserve electrical power, may be placed in a queue and await for the allocated reserve electrical power to be de-allocated from the top-ranked power-hungry device(s). A non-limiting example of reserve electrical power allocation is portrayed in the table below.

Reserve Electrical Power Allocation Example
Total Reserve Electrical Power: 300 W (watts)

| Host Priority List Rank | Power-Hungry Device | Supplemental Power Demand | Reserve Power Allocated |
|---|---|---|---|
| 1 | Device C | 100 W | 100 W |
| 2 | Device E | 100 W | 100 W |
| 3 | Device A | 50 W | 50 W |
| 4 | Device D | 150 W | 50 W (queued) |
| 5 | Device B | 150 W | 0 W (queued) |

In Step 412, additional monitoring telemetry is obtained for the top-ranked power-hungry device(s) (to which reserve electrical power had been allocated in Step 410). In one embodiment of the invention, the additional monitoring telemetry may include, but is not limited to, measurements and other information pertinent to electrical power usage.

In Step 414, a determination is made, based on the additional monitoring telemetry (obtained in Step 412), as to whether any subset of the top-ranked power-hungry device(s) (to which reserve electrical power had been allocated in Step 410) are no longer power-hungry. The determination may, for example, entail identifying any top-ranked power-hungry device(s) reflecting electrical power usage that measures a pre-defined threshold below their respective imposed electrical power limits (i.e., power-caps). The pre-defined threshold may be configured as a numerical wattage value (e.g., 100 W) or as a percentage value (e.g., 5%) of the imposed electrical power limit. Accordingly, in one embodiment of the invention, if it is determined that at least one top-ranked power-hungry device is no longer power-hungry, then the process proceeds to Step 416. On the other hand, in another embodiment of the invention, if it is alternatively determined that none of the top-ranked power-hungry device(s) are no longer power-hungry, then the process alternatively proceeds to Step 412, where additional monitoring telemetry may be obtained further still for the top-ranked power-hungry device(s).

In Step 416, following the determination (in Step 414) that at least one top-ranked power-hungry device (to which reserve electrical power had been allocated in Step 410) is no longer power-hungry, reserve electrical power is de-allocated therefrom. That is, in one embodiment of the invention, while distribution of electrical power from a primary power pool (see e.g., FIG. 3) to the at least one top-ranked power-hungry device may be maintained, supplemental electrical power from the reserve power pool to the at least one top-ranked power-hungry device may be discontinued.

In Step 418, the host priority list (generated in Step 408) is updated. Specifically, in one embodiment of the invention, the at least one top-ranked power-hungry device (determined to be no longer power-hungry in Step 414) may be removed from the host priority list. From here, in one embodiment of the invention, the process may proceed to Step 410, where reserve electrical power (de-allocated from the at least one top-ranked power-hungry device in Step 416) may be re-distributed to other one or more still power-hungry device(s) (e.g., those queued due to receiving a portion of their respective supplemental power demands or no reserve electrical power earlier) in accordance with the updated host priority list. In another embodiment of the invention, the process may alternatively proceed to Step 400, where various steps (described above) may be re-performed, thus leading to the generation of a new host priority list (and allocation of reserve electrical power based therefrom) based, at least in part, on more recent monitoring telemetry.

Figure 5:
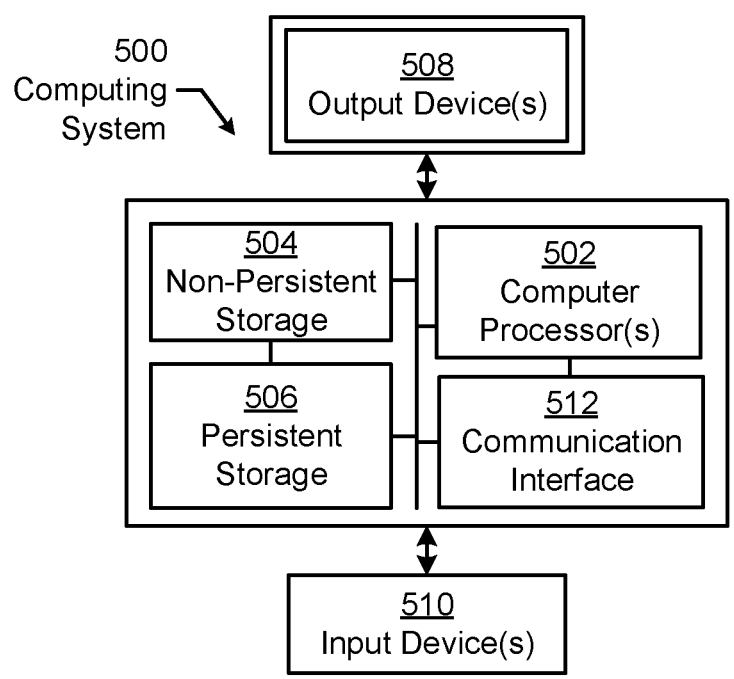
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for intelligent power distribution management, comprising:
   identifying a set of host devices each imposed with an electrical power usage limit and each permitted to temporarily exceed the electrical power usage limit by receiving available reserve electrical power from a reserve power pool;
   obtaining monitoring telemetry for each host device in the set of host devices;
   identifying, from the set of host devices and based on a portion of the monitoring telemetry, a second set of host devices each imposed with the electrical power usage limit and each reflecting an electrical power usage inside a pre-defined electrical power usage threshold from the electrical power usage limit;
   generating, based on another portion of the monitoring telemetry and in order of workload criticality for workloads supported on each host device of the second set of host devices, a host priority list ranking the second set of host devices,
      wherein the other portion of the monitoring telemetry comprises hardware configuration metadata describing a hardware configuration installed on each host device of the second set of host devices and a set of operational parameters describing a current state of each host device of the second set of host devices,
      wherein the set of operational parameters comprises at least one selected from a group consisting of a communication bus error, a basic input-output system (BIOS) status, and an operating system (OS) functionality; and
   allocating, based on the order of workload criticality reflected in the host priority list, an amount of the available reserve electrical power, and an amount of supplemental electrical power demand from a higher-ranked (HR) subset of the second set of host devices, reserve electrical power to the HR subset of the second set of host devices,
      wherein the HR subset of the second set of host devices each exhibits a supplemental electrical power demand and each receives at least a portion of the reserve electrical power matching at least a portion of the supplemental electrical power demand,
      wherein a lesser-ranked (LR) subset of the second set of host devices each exhibits a second supplemental electrical power demand and only receives at least a second portion of the reserve electrical power matching the second supplemental electrical power demand after the allocated reserve electrical power is deallocated from the HR subset of the second set of host devices,
      wherein prior to receiving at least the second portion of the reserve electrical power, the LR subset of the second set of host devices are placed in a queue while awaiting allocation of at least a portion of the second portion of the reserve electrical power,
      wherein the reserve electrical power is tapped from the reserve power pool comprising a portion of incoming electrical power from a power source,
      wherein another portion of the incoming electrical power from the power source supplies a primary power pool.

2. The method of claim 1, wherein the portion of the monitoring telemetry comprises measurements and other information pertinent to the electrical power usage.

3. The method of claim 1, wherein the other portion of the monitoring telemetry comprises the workload criticality for workloads supported on each host device of the second set of host devices and computing resource utilizations by the workloads supported on each host device of the second set of host devices.

4. The method of claim 3, wherein the host priority list is further generated through processing of the other portion of the monitoring telemetry using ensemble machine learning algorithms.

5. The method of claim 1, further comprising:
   prior to identifying the set of host devices:
      identifying, from a plurality of host devices, a third set of host devices each configured with an enabled power-cap feature,
      wherein the set of host devices is identified from the third set of host devices,
      wherein the enabled power-cap feature imposes the electrical power usage limit on each host device of the third set of host devices.

6. The method of claim 1, further comprising:
   after allocating the reserve electrical power to the at least subset of the second set of host devices:
      obtaining second monitoring telemetry for the at least subset of the second set of host devices;
      making a determination, based on the second monitoring telemetry, that at least one host device of the at least subset of the second set of host devices reflects a new electrical power usage falling below the pre-defined electrical power usage threshold from the electrical power usage limit; and
      deallocating, based on the determination, the at least portion of the reserve electrical power from, and which had been allocated to, the at least one host device of the at least subset of the second set of host devices.

7. The method of claim 6, wherein the second monitoring telemetry comprises measurements and other information pertinent to the electrical power usage.

8. A non-transitory computer readable medium (CRM) comprising computer readable program code, which when executed by a computer processor, enables the computer processor to:
   identify a set of host devices each imposed with an electrical power usage limit and each permitted to temporarily exceed the electrical power usage limit by receiving available reserve electrical power from a reserve power pool;
   obtain monitoring telemetry for each host device in the set of host devices;
   identify, from the set of host devices and based on a portion of the monitoring telemetry, a second set of host devices each imposed with the electrical power usage limit and each reflecting an electrical power usage inside a pre-defined electrical power usage threshold from the electrical power usage limit;
generate, based on another portion of the monitoring telemetry and in order of workload criticality for workloads supported on each host device of the second set of host devices, a host priority list ranking the second set of host devices,
  wherein the other portion of the monitoring telemetry comprises hardware configuration metadata describing a hardware configuration installed on each host device of the second set of host devices and a set of operational parameters describing a current state of each host device of the second set of host devices,
  wherein the set of operational parameters comprises at least one selected from a group consisting of a communication bus error, a basic input-output system (BIOS) status, and an operating system (OS) functionality; and
allocate, based on the order of workload criticality reflected in the host priority list, an amount of the available reserve electrical power, and an amount of supplemental electrical power demand from a higher-ranked (HR) subset of the second set of host devices, reserve electrical power to the HR subset of the second set of host devices,
wherein the HR subset of the second set of host devices each exhibits a supplemental electrical power demand and each receives at least a portion of the reserve electrical power matching at least a portion of the supplemental electrical power demand,
wherein a lesser-ranked (LR) subset of the second set of host devices each exhibits a second supplemental electrical power demand and only receives at least a second portion of the reserve electrical power matching the second supplemental electrical power demand after the allocated reserve electrical power is deallocated from the HR subset of the second set of host devices,
  wherein prior to receiving at least the second portion of the reserve electrical power, the LR subset of the second set of host devices are placed in a queue while awaiting allocation of at least a portion of the second portion of the reserve electrical power,
wherein the reserve electrical power is tapped from the reserve power pool comprising a portion of incoming electrical power from a power source,
wherein another portion of the incoming electrical power from the power source supplies a primary power pool.

9. The non-transitory CRM of claim 8, wherein the portion of the monitoring telemetry comprises measurements and other information pertinent to the electrical power usage.

10. The non-transitory CRM of claim 8, wherein the other portion of the monitoring telemetry comprises the workload criticality for workloads supported on each host device of the second set of host devices and computing resource utilizations by the workloads supported on each host device of the second set of host devices.

11. The non-transitory CRM of claim 10, wherein the host priority list is further generated through processing of the other portion of the monitoring telemetry using ensemble machine learning algorithms.

12. The non-transitory CRM of claim 8, comprising computer readable program code, which when executed by the computer processor, further enables the computer processor to:
  prior to identifying the set of host devices:
    identify, from a plurality of host devices, a third set of host devices each configured with an enabled power-cap feature,
    wherein the set of host devices is identified from the third set of host devices,
    wherein the enabled power-cap feature imposes the electrical power usage limit on each host device of the third set of host devices.

13. The non-transitory CRM of claim 8, comprising computer readable program code, which when executed by the computer processor, further enables the computer processor to:
  after allocating the reserve electrical power to the at least subset of the second set of host devices:
    obtain second monitoring telemetry for the at least subset of the second set of host devices;
    make a determination, based on the second monitoring telemetry, that at least one host device of the at least subset of the second set of host devices reflects a new electrical power usage falling below the pre-defined electrical power usage threshold from the electrical power usage limit; and
    deallocate, based on the determination, the at least portion of the reserve electrical power from, and which had been allocated to, the at least one host device of the at least subset of the second set of host devices.

14. The non-transitory CRM of claim 13, wherein the second monitoring telemetry comprises measurements and other information pertinent to the electrical power usage.

* * * * *